(No Model.)

B. E. J. EILS.
DUPLEX TELEGRAPH.

No. 337,314. Patented Mar. 2, 1886.

Witnesses:
E. J. Walker
Wm. E. Dyre

Inventor:
B. E. J. Eils (No Model.)

B. E. J. EILS.
DUPLEX TELEGRAPH.

No. 337,314.

2 Sheets—Sheet 2.

Patented Mar. 2, 1886.

Witnesses:
E. J. Walker
Wm. E. Dyre.

Inventor:
B. E. J. Eils

UNITED STATES PATENT OFFICE.

BETTE E. J. EILS, OF WASHINGTON, DISTRICT OF COLUMBIA.

DUPLEX TELEGRAPH.

SPECIFICATION forming part of Letters Patent No. 337,314, dated March 2, 1886.

Application filed November 17, 1885. Serial No. 183,125. (No model.)

*To all whom it may concern:*

Be it known that I, BETTE E. J. EILS, a citizen of the United States, residing at Washington, in the District of Columbia, have invented a certain new and useful Balance for the Static Charge and Static Discharge on Duplex Telegraphs; and I do hereby declare the following to be a full, clear, and exact description of the invention, such as will enable others skilled in the art to which it appertains to make and use the same.

My invention relates to that general type of duplex telegraphs in which a so-called "artificial line" is used at each terminal station for the purpose of neutralizing the effects of the currents from the home battery with respect to the home relay, and to that particular species of such duplex telegraphs operated by intermittent currents, as distinguished from that species thereof operated by reversals of the flow of a constant current.

My invention consists of the art of and means for sending momentary primary currents of required strength and direction over the artificial line at the moment of connecting the battery to the line and at the moment of disconnecting it therefrom to neutralize the line-currents of static charge and static discharge on the home relay.

In order that my invention may be clearly understood, I have illustrated in the annexed drawings, and will proceed to describe, a practical form thereof as applied to a differential duplex telegraph, equally applicable, as will be readily understood, to a Wheatstone bridge duplex telegraph.

Figure 1:
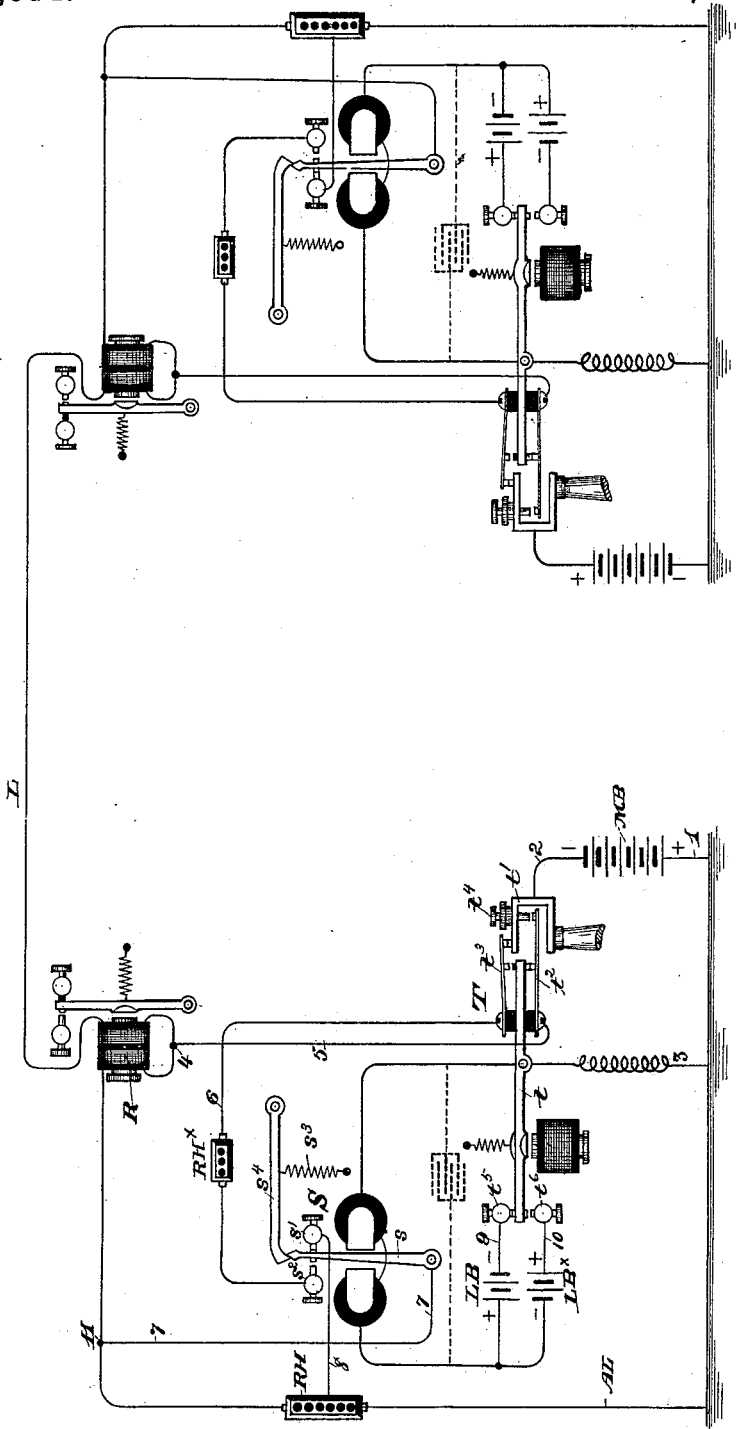

Figure 1 is a conventional diagram illustrating a differential duplex telegraph embodying my invention.

The apparatuses at the respective ends of the main line L being exactly alike, except that the line-battery at one end of the line is shown as grounded from its positive pole and that at the other end as grounded from its negative pole—an arrangement which is by no means essential—I shall describe one apparatus only.

The line-battery MB, which is normally cut out, is grounded from its positive pole by wire 1. Its negative pole is connected by wire 2 with the post $t'$ of the transmitter T. The lever $t$ of the transmitter is grounded by wire 3, and carries two insulated contact-springs, $t^2$ and $t^3$. The line L is connected to the post 4, which is in turn connected by wire 5 with contact-spring $t^2$. One end of the artificial line AL is connected to post 4, and the other end is grounded. When the transmitter is at rest, as shown in Fig. 1, its spring $t^2$ makes contact with its lever $t$; but when the transmitter is in action then contact-spring $t^2$ is pressed away from lever $t$ by contact-screw $t^4$ on post $t'$. Contact-spring $t^3$ makes contact with post $t'$ when the transmitter is at rest; but when the transmitter is in action then this contact-spring $t^3$ is pressed away from post $t'$ by an insulated point on lever $t$. The parts are so adjusted that in the operation of the transmitter the makes and breaks between contact-spring $t^3$ and post $t'$ are coincident with the makes and breaks between contact-spring $t^2$ and lever $t$. Contact-spring $t^3$ is connected by wire 6 with the contact-screw $s^2$ of the polarized electro-magnetic switch S. The armature or switch-lever $s$ of this switch is connected by wire 7 with the artificial line at a point, 11, between the relay R and the adjustable rheostat RH. The contact-screw $s'$ of this switch is connected by wire 8 with rheostat RH. One end of the coil of the electro-magnet of the switch S is connected with the lever $t$ of transmitter T, while the other end of the said coil is connected by a branch, 9, with contact-screw $t^5$ of the transmitter, and by another branch, 10, with contact-screw $t^6$ of the transmitter. Branch 9 contains a local battery, LB, and branch 10 a reverse local battery, LB$^\times$, so that a current will flow in one direction or the other, according as branch 9 or branch 10 is closed. While the transmitter is passing from screw $t^5$ to screw $t^6$, or vice versa, the circuit of the electro-magnetic switch is interrupted. In order to maintain the switch-lever $s$ at such times in firm contact with the screw against which it may be resting, the mechanical contrivance shown may be used, consisting of an adjustable retractile spring, $s^3$, and a pivoted arm, $s^4$, terminating at its outer end in a laterally-projecting wedge, adapted to press against either side of the wedge-shaped end of the switch-lever $s$. Relay R is a so-called "differential" relay, one coil being in the line-circuit and an equating-coil in the artificial-line circuit. When the whole of rheostat RH is included in the artificial line, its resistance is equal to that of the line. It will be observed that when the transmitter is at rest a portion of rheostat RH is shunted by switch S, so that the normal resistance of the artificial line is less than that of the line by the shunted portion of the rheostat. So much of the rheostat—the whole, if necessary—must be shunted by suitable adjustment of wire 8 along the rheostat that on closing the transmitter the strength of the current flowing from the home battery over the artificial line will be sufficient to balance the static charge of the line, so that the core of the relay remains neutral, or is not, at any rate, sufficiently energized to overpower the antagonizing action of the retractile spring on the armature. The static charge begins, practically, the instant when the line-battery is put in circuit at the initial contact of spring $t^2$ and screw $t^4$, at which time the transmitter-lever $t$ is about midway of its stroke from contact-screw $t^5$ to contact-screw $t^6$. The switch maintains the shunt until transmitter-lever $t$ strikes contact-screw $t^6$, and thereby closes the circuit of the electro-magnet of the switch through battery LB$^\times$, whereupon the switch-lever $s$ is instantly moved from contact-screw $s'$ to contact-screw $s^2$ and the shunt broken, so that then the whole of rheostat RH becomes an effective resistance in the artificial line. On striking screw $s^2$ the switch-lever $s$ establishes a connection between wires 6 and 7, so that now there is an unbroken conducting-branch from contact-spring $t^3$ to the artificial line at point 11 between rheostat RH and relay R; hence when on opening the transmitter contact-spring $t^3$ strikes post $t'$, which occurs at the moment when contact spring $t^2$ breaks from contact-screw $t^4$, and when the transmitter-lever $t$ is about midway of its back-stroke from contact-screw $t^6$ to contact-screw $t^5$ a current will flow from the home battery over this branch and that portion of the artificial line which contains the equating-coil of the relay in a direction opposite to that of the line-current which just ceased flowing from the battery. The strength of this reverse current must be regulated to balance the static discharge of the line. This may be effected by the use of an adjustable rheostat, RH$^\times$, in wire 6 to adjust the resistance of the branch.

The switch maintains the connection between wires 6 and 7 and the flow of the reverse current until transmitter-lever $t$ strikes contact-screw $t^5$, and thereby closes the circuit of the electro-magnet of the switch through battery LB, whereupon the switch-lever $s$ is instantly moved back from contact-screw $s^2$ to contact-screw $s'$, breaking the connection between wires 6 and 7 and establishing the normal condition of the parts, the line-battery being entirely cut out.

Figure 2:
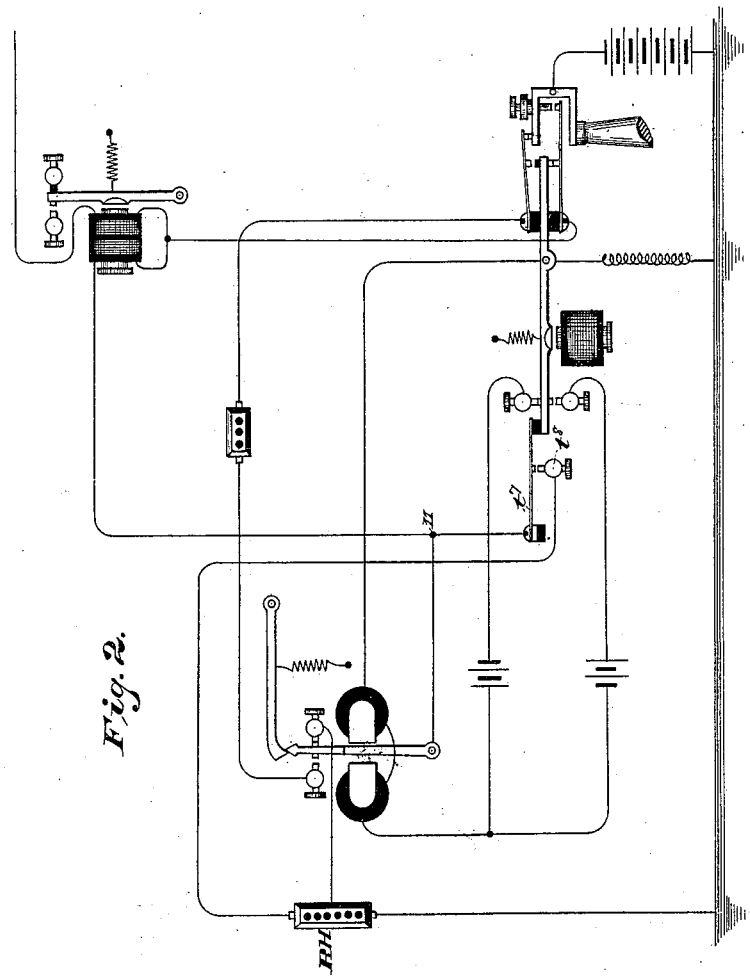

Under the arrangement shown in Fig. 1 the reverse current divides at point 11, a portion going through the rheostat RH to earth. To avoid this division of the reverse current the modified arrangement shown in Fig. 2 may be used, which arrangement differs from that shown in Fig. 1 only in this respect—namely, that the transmitter embodies another contact-spring, $t^7$, and another contact-screw, $t^8$, for breaking the artificial line between point 11 and the rheostat RH simultaneously with the establishment of the reverse current, so that the whole of such current will be available for balancing the static discharge of the line.

In the examples illustrated the wire 8 and contact-screw $s'$ form what I term the "shunt" in connection with switch-lever $s$ and wire 7, while what I term the "branch" is composed of the spring $t^3$, wire 6, and screw $s^2$ in connection with the same switch-lever $s$ and wire 7. The shunt must be held closed to the end or very nearly to the end of the static charge of the line, while the branch must be held closed to the end or very nearly to the end of the static discharge of the line. The duration of the charge and discharge varies with the length and varying condition of the line.

For most lines the practicable adjustments of the contact-screws $t^5$ and $t^6$ of the transmitter and of the retractile spring $s^3$ of the switch will provide all-sufficient means for properly timing the alternate breaks of the shunt and branch. If the adjustments are found insufficient on very long lines, the action of the switch may be further retarded—as, for instance, by the use of a sluggish electro-magnet for operating the switch-lever, or by a condenser branch around the electro-magnet of the switch, as indicated by dotted lines in Fig. 1, or by any other known means for retarding the action of an electro-magnet.

I have described an electro-magnetic switch, and prefer it to any other, on account of its reliability of action and its greater range of usefulness; but I do not primarily confine myself to an electro-magnetic switch. I believe that I am the first to so combine an automatic switch with the artificial line and the transmitter of a duplex telegraph operated by intermittent currents that the switch maintains, at the time established, the circuit-connections through it for a moment after the transmitter connects the battery to the line or disconnects it therefrom, so as to cause a momentary battery or primary current of proper strength and direction to flow over the artificial line to neutralize the current of static charge or static discharge flowing over the line, after which the switch shifts and changes the circuit-connections through it. Therefore I claim this combination as broadly as is possible within legal bounds.

I claim as my invention—

1. The art of neutralizing the line-currents of static charge and static discharge on the home relay of duplex telegraphs operated by intermittent currents, which consists in sending momentary opposing primary currents of proper strength over the artificial line.

2. In a duplex telegraph operated by intermittent currents, the combination, substantially as before set forth, with the transmitter and the artificial line, of a shunt, a branch, and an automatic switch, whereby battery-currents of proper strength and direction are sent over the artificial line to neutralize the currents of static charge and static discharge on the line.

3. The combination, substantially as before set forth, of the main line, the artificial line, the main battery normally out of circuit, a normally-closed shunt connected with the artificial line, a normally-open branch from the main battery to the artificial line, a transmitter or key which alternately connects the same pole of the main battery with the said branch and with the junction of the main and artificial lines, and an automatic switch which breaks the said branch when it closes the said shunt and closes the branch when it breaks the shunt.

4. The combination, substantially as before set forth, of the main line, the artificial line, the main battery normally out of circuit, a normally-closed shunt connected with the artificial line, a normally-open branch from the main battery to the artificial line, a transmitter or key which alternately connects the same pole of the main battery with the said branch and with the junction of the main and artificial lines, and an electro-magnetic switch which breaks the said branch when it closes the said shunt and closes the branch when it breaks the shunt.

In testimony whereof I affix my signature in presence of two witnesses.

B. E. J. EILS.

Witnesses:
EDWARD T. WALKER,
M. P. CALLAN.